June 2, 1959  F. J. ALBERTY  2,889,066
AUTOMATIC FILM MOUNTING MACHINE
Filed Sept. 17, 1957  8 Sheets-Sheet 1

INVENTOR.
FRED J. ALBERTY
BY Robert C. Comstock
ATTORNEY.

June 2, 1959

F. J. ALBERTY 2,889,066

AUTOMATIC FILM MOUNTING MACHINE

Filed Sept. 17, 1957

INVENTOR.
FRED J. ALBERTY
BY
ATTORNEY.

June 2, 1959 F. J. ALBERTY 2,889,066
AUTOMATIC FILM MOUNTING MACHINE
Filed Sept. 17, 1957 8 Sheets-Sheet 3

INVENTOR.
FRED J. ALBERTY
BY Robert C. Comstock
ATTORNEY.

June 2, 1959

F. J. ALBERTY

2,889,066

AUTOMATIC FILM MOUNTING MACHINE

Filed Sept. 17, 1957

INVENTOR.
FRED J. ALBERTY
BY Robert C. Comstock
ATTORNEY.

June 2, 1959

F. J. ALBERTY 2,889,066

AUTOMATIC FILM MOUNTING MACHINE

Filed Sept. 17, 1957

INVENTOR.
FRED J. ALBERTY
BY
ATTORNEY.

June 2, 1959  F. J. ALBERTY  2,889,066
AUTOMATIC FILM MOUNTING MACHINE
Filed Sept. 17, 1957  8 Sheets-Sheet 6

INVENTOR.
FRED J. ALBERTY
BY
ATTORNEY.

June 2, 1959　　　F. J. ALBERTY　　　2,889,066
AUTOMATIC FILM MOUNTING MACHINE
Filed Sept. 17, 1957　　　　　　　　　　　　　　8 Sheets-Sheet 7

INVENTOR.
FRED J. ALBERTY
BY Robert C. Comstock
ATTORNEY.

June 2, 1959

F. J. ALBERTY 2,889,066

AUTOMATIC FILM MOUNTING MACHINE

Filed Sept. 17, 1957

INVENTOR.
FRED J. ALBERTY
BY
ATTORNEY.

2,889,066

United States Patent Office

Patented June 2, 1959

2,889,066

AUTOMATIC FILM MOUNTING MACHINE

Fred J. Alberty, Los Angeles, Calif.

Application September 17, 1957, Serial No. 684,532

9 Claims. (Cl. 216—28)

This invention relates to an automatic film mounting machine.

It is an object of my invention to provide a machine which will automatically completely mount and seal film transparencies to form slides for subsequent use in viewers or projectors.

My invention is particularly adapted for use in mounting 35 mm. film transparencies and has as one of its objects the provision of such a device in which the individual transparencies are automatically severed from the film reel and mounted in film mounts which are automatically severed from a continuous web.

It is a further object of my invention to provide a device of the class described in which the complete film mounting sequence is performed automatically. Such sequence includes cutting the individual transparency from a roll of film, cutting an individual film mount from a continuous web, placing the transparency in proper position within the film mount, tacking the transparency in position, folding the mount to enclose the transparency, sealing the mount, numbering the mount and stacking the finished mounts in their proper numerical order.

Another object of my invention is to provide an automatic film mounting machine of the type described in which the operations set forth above are automatically performed in their proper sequence and synchronization, and in which the operation and construction of the device are essentially simple and efficient.

It is accordingly an object of my invention to provide an automatic film mounting machine having all of the advantages and benefits of the construction set forth above. Because of the complex nature of the device, further objects and advantages of my invention will become more readily apparent from a consideration of the detailed description and accompanying drawings describing and illustrating a preferred embodiment of my invention.

While I have shown in the accompanying drawings a preferred embodiment of my invention, it should be understood that the same is susceptible of modification and change without departing from the spirit of my invention.

Referring to the drawings.

A preferred embodiment which has been selected to illustrate my invention comprises a chassis 10, which contains most of the operating mechanism of my device. Extending longitudinally across the top of the chassis 10 adjacent one side thereof is a film mount track 11. A web 12 is mounted on a suitable reel of conventional construction (not shown in the drawings), with the end of the web 12 extending along the track 11. Portions of the track 11 overlie the opposite side edges of the end of the web 12 to hold the web 12 flat while the track 11 guides its movement across the chassis 10. The web 12 is provided with a continuous series of spaced aligned pairs of film mount openings 13, which openings extend longitudinally with respect to the web 12.

Figure 1:
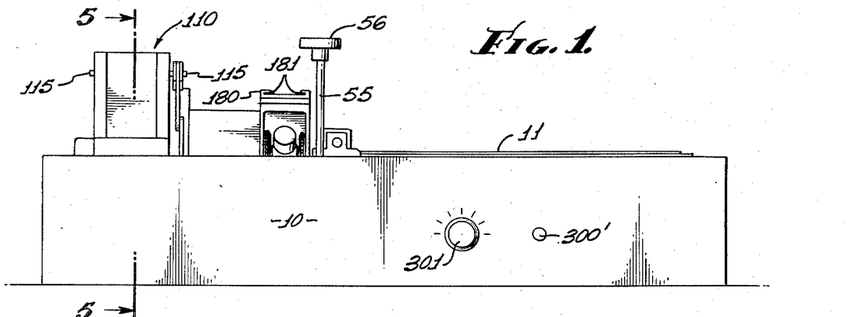
Fig. 1 is a front elevational view of my automatic film mounting machine.
Figure 2:
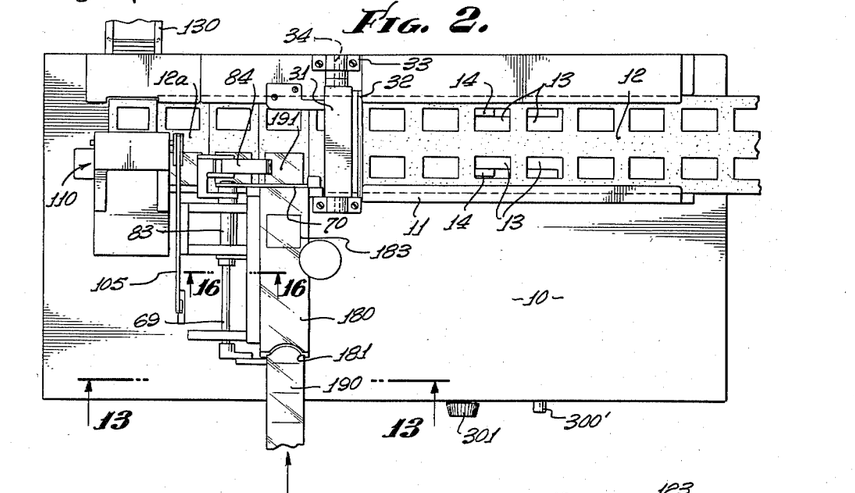
Fig. 2 is a top plan view of the same.
Figure 3:
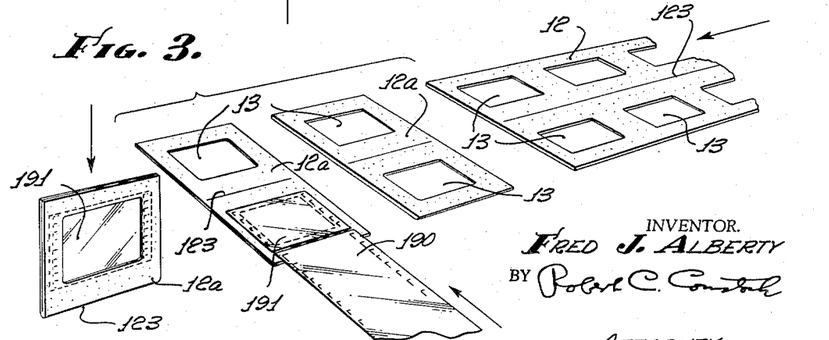
Fig. 3 is a perspective view showing, from right to left, the film mount web, a severed individual film mount, the placement of a transparency in position within the open mount, and the closed or folded mount containing the transparency.
Figure 4:
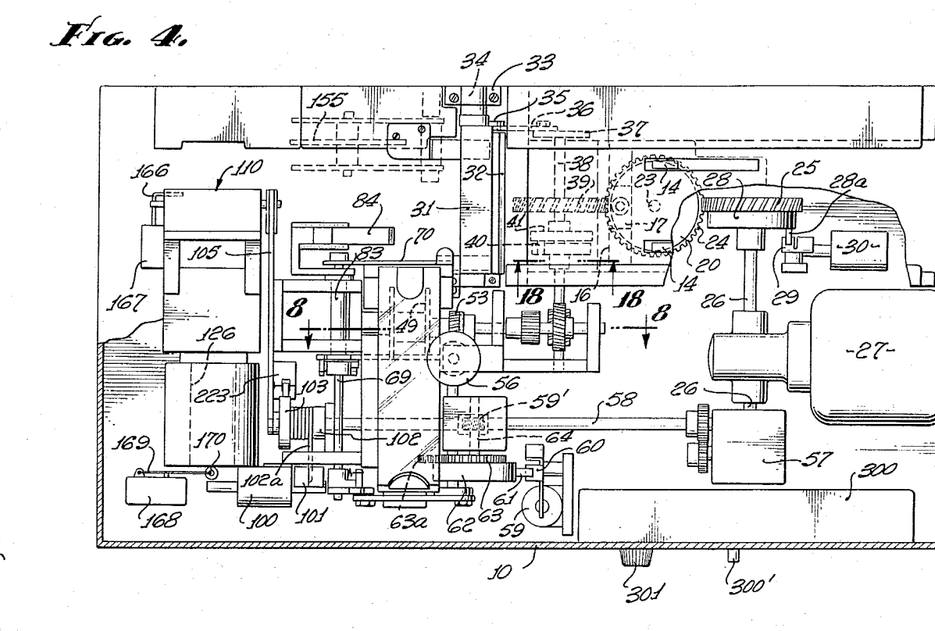
Fig. 4 is a top plan view enlarged from Fig. 2, with the cover removed and portions broken away to show the interior structure.
Figure 5:
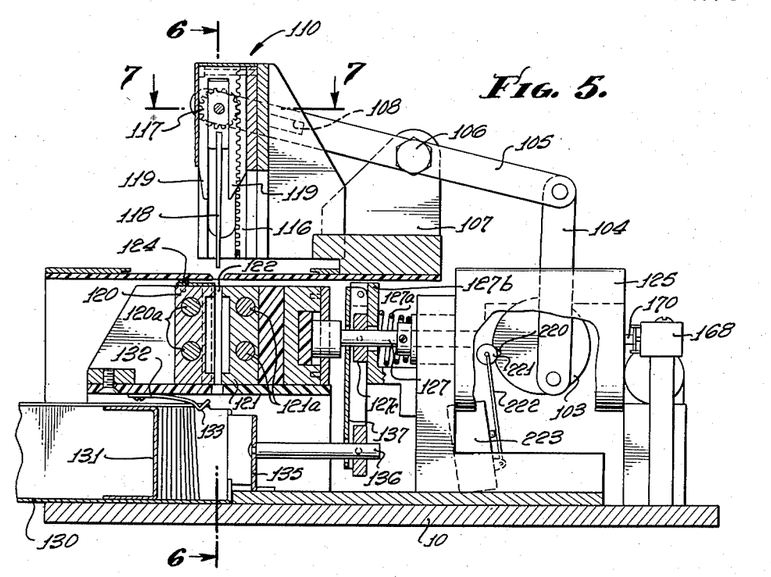
Fig. 5 is a sectional view taken on line 5—5 of Fig. 1, showing the folding, sealing and stacking mechanism.
Figure 6:
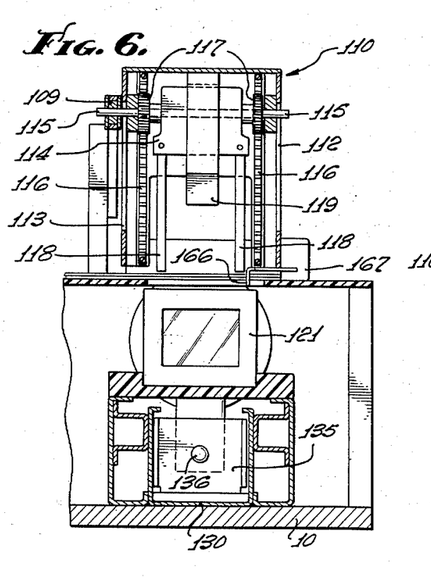
Fig. 6 is a sectional view of the same, taken on line 6—6 of the Fig. 5.
Figure 7:
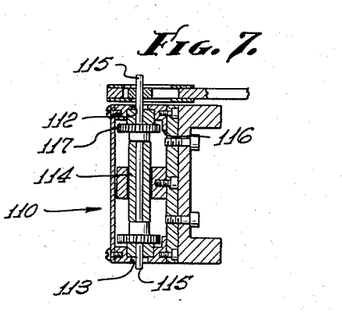
Fig. 7 is a sectional view of the same, taken on line 7—7 of Fig. 5.
Figures 8, 9, 10:
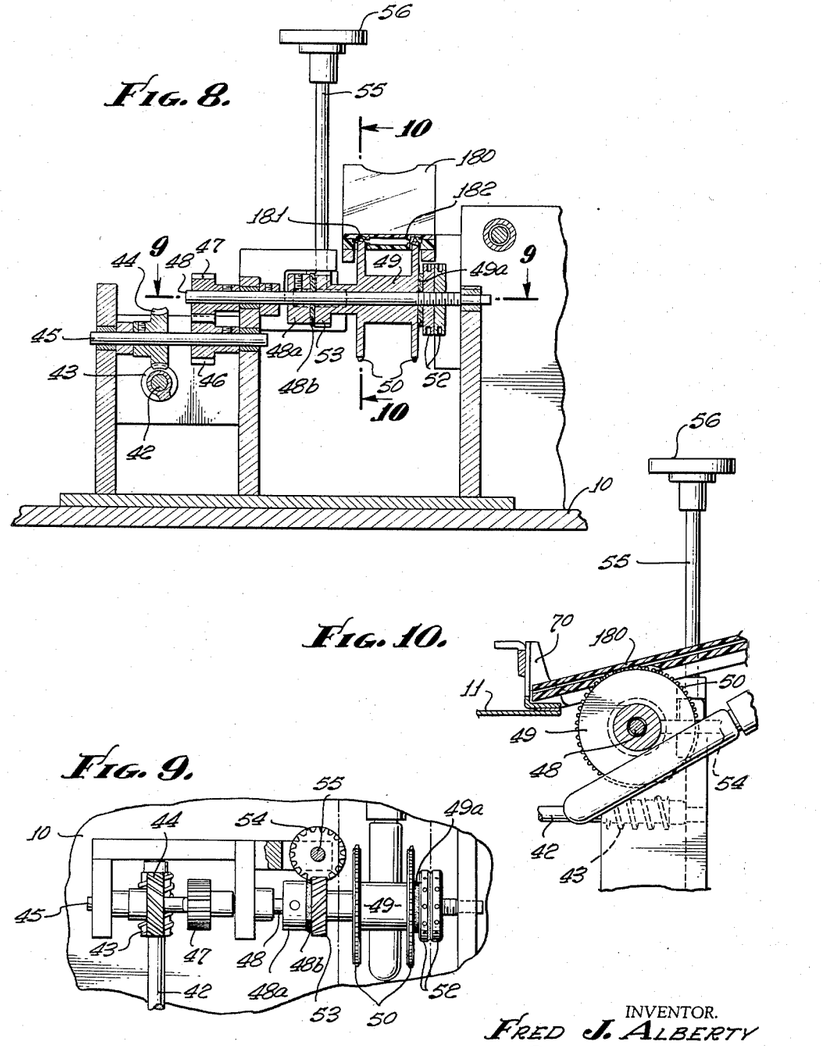
Fig. 8 is a sectional view taken on line 8—8 of Fig. 4, showing the film feeding and adjusting mechanism.
Fig. 9 is a sectional view of the same, taken on line 9—9 of Fig. 8.
Fig. 10 is a sectional view of the same, taken on line 10—10 of Fig. 8.
Figure 11:
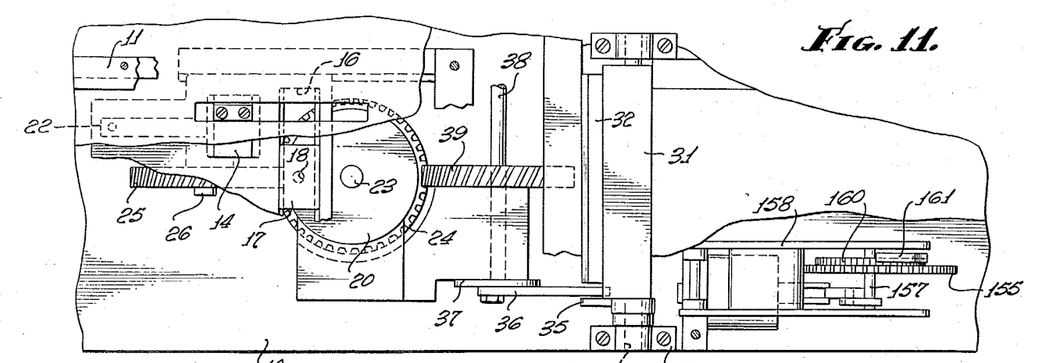
Fig. 11 is a top plan view of the film mount web feeding and cutting mechanism.
Figure 12:
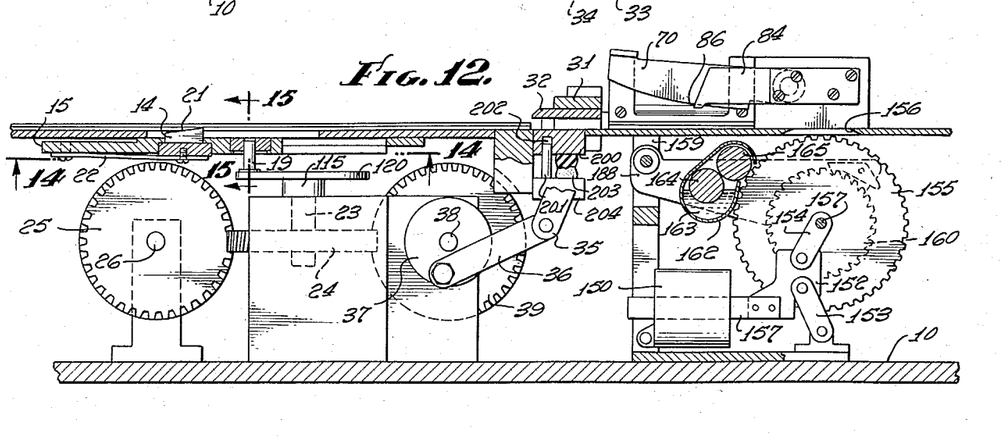
Fig. 12 is a front view of the same partly in section.
Figure 13:
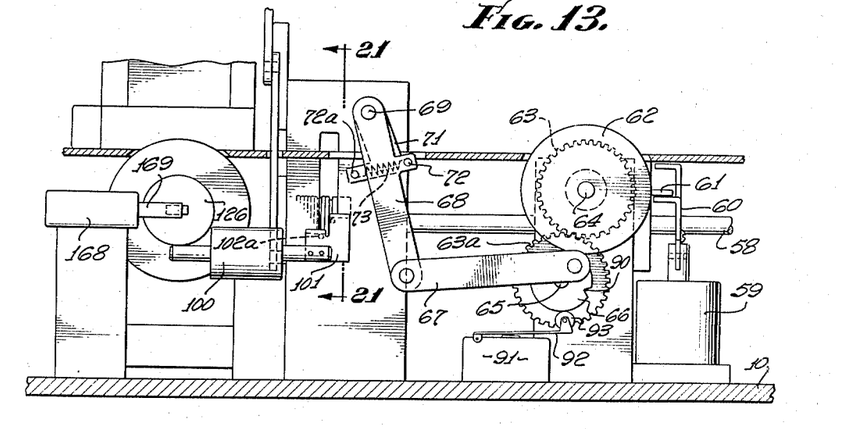
Fig. 13 is a rear elevational view of the film cutting mechanism, taken on line 13—13 of Fig. 2.
Figure 14:
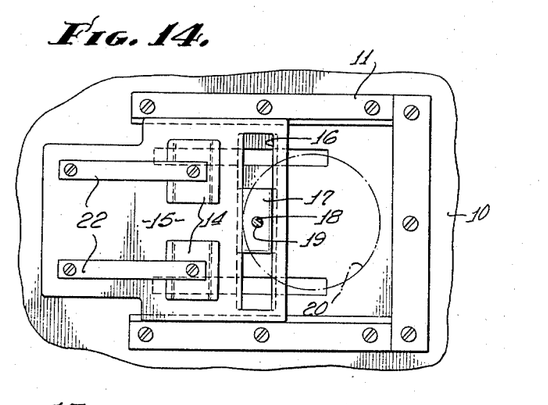
Fig. 14 is a sectional view of a portion of the film mount web feeding assembly, taken on line 14—14 of Fig. 12.
Figure 15:
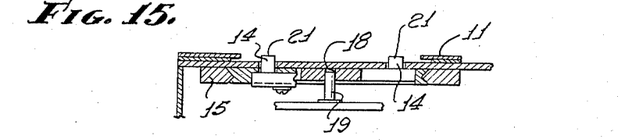
Fig. 15 is a sectional view of the same, taken on line 15—15 of Fig. 12.
Figures 16, 17, 18:
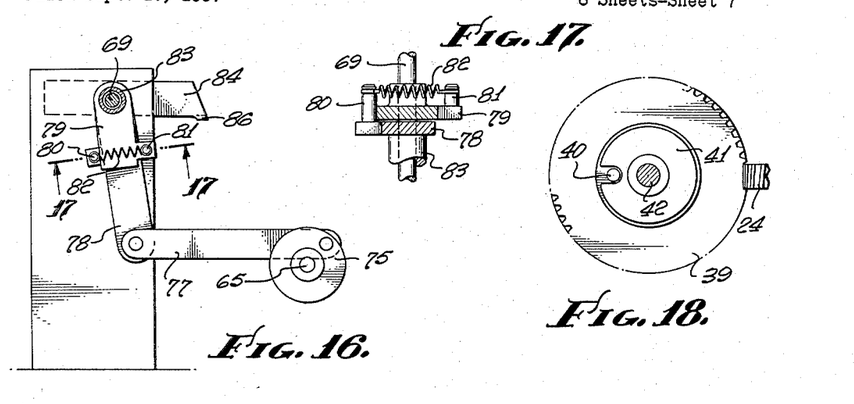
Fig. 16 is a sectional view showing the control arms for the film tacker, taken on line 16—16 of Fig. 2.
Fig. 17 is a sectional view of the same, taken on line 17—17 of Fig. 16.
Fig. 18 is a sectional view of the coupling between the web feeding and film feeding, taken on line 18—18 of Fig. 4.
Figure 19:
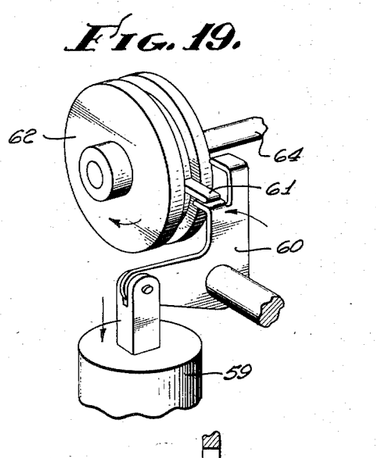
Fig. 19 is a perspective view of the film cutting and tacking solenoid and clutch.
Figure 20:
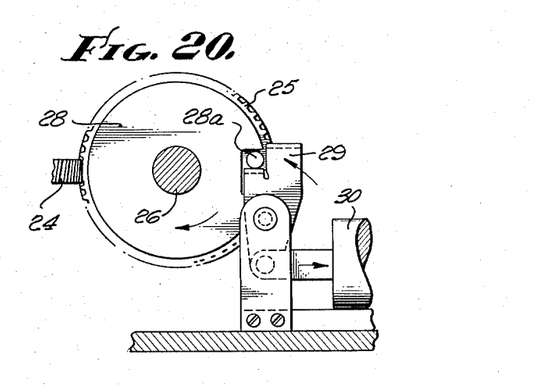
Fig. 20 is an elevational view of the web feeding solenoid.
Figure 21:
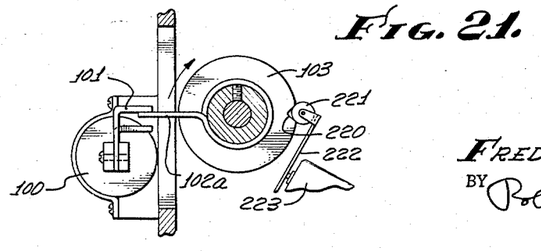
Fig. 21 is a sectional view of the film folding solenoid, taken on line 21—21 of Fig. 13.

As shown in Fig. 3 of the drawings, the web 12 is severed between each pair of openings 13 to provide an individual mount 12a, in which the transparency is placed. The mount 12a is then folded and sealed around the transparency.

The web 12 is unwound from its reel and fed along the track 11 by a pair of fingers 14, which extend upwardly from beneath the track 11 and engage the inner edges of one set of openings 13. The fingers 14 are attached beneath the track 11 to a sliding member 15, which is mounted for reciprocal movement parallel to and directly beneath the track 11. The sliding member 15 is provided with a transverse elongated slot 16, in which a block 17 is mounted for reciprocal movement across the slot 16. The block 17 is provided with an opening 18, in which the upper end of a pin 19 is rotatably mounted. The lower end of the pin 19 is attached adjacent the periphery of a circular plate 20, which is rotatably mounted beneath the track 11 and sliding member 15.

As the circular plate 20 rotates, it moves the pin 19 in a circular path. The pin 19 in turn causes the block 17 to move across the slot 16, at the same time causing the sliding member 15 to move in a direction parallel to the track 11. It will thus be seen that as the circular plate 20 makes one complete revolution, it causes the sliding member 15 to move reciprocally away from the reel on which the web 12 is mounted and then back toward it.

The fingers 14 are provided with smooth angled upper surfaces 21, which are slanted upwardly in the direction of forward movement of the web 12. Upon the backward or return movement of the fingers 14, the upper surfaces 21 slide beneath the portion of the web 12 between the sets of openings 13 until they reach the next adjacent set of openings 13. The fingers 14 are then forced upwardly into the openings 13 by a pair of leaf springs 22, which are attached at one end to the bottom of the sliding member 15 and at the other end to the bottom of the fingers 14. The leaf springs 22 permit depression of the fingers 14 beneath the closed portions of the web 12 and their elevation into the openings 13. When the fingers 14 are disposed within the openings 13, their forward edges engage the side edges of the openings 13 to move the web 12 forwardly during the forward movement of the sliding member 15. The distance traveled by the fingers 14 is coordinated with the distance between the openings 13, so that the web 12 is advanced the distance of one individual film mount by each revolution of the circular plate 20.

The circular plate 20 is mounted on the upper end of a vertical shaft 23, which is rotated by a circular horizontal gear 24. The horizontal gear 24 has helical gear teeth around its periphery which engage the corresponding helical gear teeth of a vertical gear 25. The vertical gear 25 is mounted adjacent one end of a horizontal shaft 26, which is driven by an electric motor 27 mounted within the chassis 10.

A single revolution clutch 28 controls the rotation of the vertical gear 25. A stop member 29 is pivotally mounted adjacent the periphery of the clutch 28. The stop member 29 is operated by a solenoid 30. When the solenoid 30 is energized, the stop member 29 is pivoted out of engagement with a pin 28a which protrudes from the clutch 28. This releases the pin 28a, so that the clutch 28 is engaged and the vertical gear 25 is rotated by the shaft 26, which is in turn driven by the motor 27. When the solenoid 30 is de-energized, the stop member 29 moves back into the path of the pin 28a. When the vertical gear 25 completes a single revolution, the pin 28a engages the stop member 29, causing the clutch 28 to be disengaged, so that the vertical gear 25 is no longer rotated by the shaft 26.

It should be noted that the rotation of the vertical gear 25 stops when the pin 19 is in its rearmost position. At this time, the sliding member 15 and the fingers 14 are also in their rearmost position.

The individual film mounts 12a are severed from the web 12 by a film mount cutter 31, which is mounted transversely across the track 11 and has a blade 32. The cutter 31 is mounted between a pair of vertical supports 33, which are disposed on opposite sides of the track 11. The cutter 31 is provided with a pair of horizontal shafts 34, which are rotatably journaled in the supports 33. A first lever arm 35 is attached at one end to one of the shafts 34 and at its opposite end to one end of a second lever arm 36. The other end of the second lever arm 36 is secured adjacent the periphery of a vertical plate 37. The plate 37 is rotatably driven by a horizontal shaft 38, which is in turn driven by a circular vertical gear 39. The vertical gear 39 has helical gear teeth which engage the corresponding gear teeth of the above described circular horizontal gear 24.

It will thus be seen that as the circular horizontal gear 24 rotates, it causes the fingers 14 to move forward and carry the web 12 forwardly the distance of one film mount. The movement of the film mount cutter 31 is synchronized so that the cutter blade 32 does not engage the web 12 until after the forward movement of the web 12 has stopped. Thus, during the last half of the rotation of the horizontal gear 24 the fingers 14 are moving back and the web 12 is stationary. At this time, the cutter blade 32 moves downwardly to sever an individual film mount 12a from the web 12.

In severing the web 12, the cutter blade 32 pivots downwardly past the edge of the track 11 and against a pusher block 200, which is mounted directly beneath the cutter 31. The pusher block 200 is formed of rigid material and is supported by a pair of spaced pins 201, which extend into openings 202 in the bottom of the pusher block 200. A piece of sponge rubber 203 or other suitable resilient material is mounted beneath the pusher block 200, to provide a floating support. The sponge rubber 203 is in turn mounted on a support 204 which is secured to the chassis 10.

The pusher block 200 acts to permit the cutter blade to perform a complete severing of the web 12. When the cutting operation is completed and the cutter blade 32 pivots back to its raised position, the sponge rubber 203 moves the pusher block 200 back to its normal position, in which its upper surface is disposed on a level with the bottom of the track 11. As it moves upwardly, the pusher block 200 causes the severed film mount 12a to be returned to a position directly in the path of the end of the web 12. When the web 12 is again moved forwardly by the fingers 14, the severed film mount 12a is moved along the track 11 in the same direction as the web 12.

The film is moved simultaneously with the movement and cutting of the web 12, its movement also being derived from the above described vertical gear 39, the rotation of which is controlled by the single revolution clutch 28 and solenoid 30. For this purpose the vertical gear 39 is provided with a crank pin 40, which is fitted into a notch in the periphery of a coupling plate 41. The coupling plate 41 is mounted on one end of a horizontal shaft 42, the other end of which carries a worm 43. The worm 43 engages a worm gear 44, which is mounted adjacent one end of a perpendicular horizontal shaft 45. The other end of the shaft 45 carries a spur gear 46, the teeth of which engage a corresponding spur gear 47, which is disposed thereabove. The second spur gear 47 is mounted adjacent one end of a horizontal shaft 48. A collar 48a is secured to the shaft 48. A cork washer 48b is mounted between the collar 48a and a vertical adjustment gear 53, which is mounted on the shaft 48, but is not secured to it. A film reel 49, having a pair of integral spaced 40-tooth sprockets 50, is mounted adjacent the vertical adjustment gear 53. The reel 49 engages, but is not secured to, the shaft 48. A cork washer 49a is disposed between the opposite side of the reel 49 and a pair of lock plates 52. There is sufficient frictional engagement between the film reel 49 and the shaft 48 to result in rotation of the film reel 49 when the shaft 48 is rotated.

The vertical adjustment gear 53 has helical teeth which engage the corresponding teeth of a horizontal adjustment gear 54. The horizontal adjustment gear 54 is mounted adjacent the lower end of a vertical shaft 55, the upper end of which carries an adjustment knob 56, which protrudes from a top of the chassis 10. The adjustment knob 56 is adapted to be manually rotated to cause rotation of the shaft 55 and the horizontal adjustment gear 54. The teeth of the horizontal adjustment gear 54, being engaged with the teeth of the vertical adjustment gear 53, cause the simultaneous rotation of the vertical adjustment gear 53 and the film reel 49 with respect to the shaft 48. This rotation takes place between the washers 48a and 49a, which permit a slipping rotation of the vertical gear 53 and film reel 49 between them. The force applied through the adjustment knob 56 overcomes the frictional engagement between the shaft 48 and the film reel 49 and vertical adjustment gear 53.

A film guide 180 is mounted at an angle, with its lower end slightly overlying the side of the track 11. The film guide 180 is provided with narrow slots 181 on its opposite sides which are adapted to receive the perforated edges of a roll 190 of exposed and developed film. Clearance is provided adjacent the portion of the film disposed between the slots 181 to avoid scratching the exposed portion of the film. The bottom of the film guide 180 is provided with a pair of cutaway portions 182, which extend into the slots 181. The sprockets 50 extend into the cutaway portions 182 to engage the perforations along the edges of the film roll 190.

The film guide 180 is provided with a pair of spaced guide lines 183, which extend transversely thereacross. The guide lines 183 are spaced from each other the proper distance for a single transparency 191 of the film roll 190. In the case of film exposed by amateurs, the exposures are often not properly spaced along the roll of film. This difficulty can be overcome by the operator optically noting the relationship between the separation lines on the film and the guide lines 183. These lines can be brought into alignment through use of the film adjustment knob 56 in the manner described above. This adjustment does not affect the normal operation of the film feeding mechanism after the transparency has been properly aligned.

It will thus be seen that as the horizontal gear 24 rotates, it causes the rotation of the vertical gear 39, which in turn causes rotation of the shaft 45. As the shaft 45 rotates, it rotates the film sprockets 50 to cause the film roll 190 to be fed toward the track 11. The worm gears 43 and 44 provide a five to one reduction, so that the film sprockets 50 move a distance of eight sprocket holes, just the length of a single transparency 191.

The shaft 26 is connected at one end to a gear box 57, through which it causes the rotation of a horizontal shaft 58, which extends longitudinally with respect to the chassis 10. The film cutting, tacking and sealing are all operated from this shaft 58. The film cutting and tacking are started by the energization of a solenoid 59, which pivots a stop member 60 to release the control pin 61 of a single revolution clutch 62. The clutch 62 is connected to a vertical gear 63. When the clutch 62 is engaged, it causes the rotation of the vertical gear 63 through a shaft 64, which is driven by the shaft 58 through a pair of helical gears 59. As the vertical gear 63 rotates, it causes the rotation of a second intermeshed vertical gear 63a which is disposed beneath it. Rotation of the second vertical gear 63a in turn causes the rotation of a horizontal shaft 62, adjacent the mid-portion of which it is mounted.

A vertical plate 66 is carried by one end of the shaft 62. A first lever arm 67 is attached at one end adjacent the periphery of the vertical plate 66. A second lever arm 68 is attached at one end thereof to the opposite end of the first lever arm 67 and at its opposite end to one end of a horizontal shaft 69, which extends transversely across the chassis 10 adjacent the upper portion thereof. A film cutter blade 70 is carried by the opposite end of the shaft 69 and is pivoted vertically by the rotation of the shaft 69.

A retainer arm 71 is attached at one end to the shaft 69 and extends parallel to the second lever arm 68. A pin 72 protrudes from the second lever arm 68 and a second pin 72a protrudes from the retainer arm 71. A coil spring 73 extends between the pins 72 and 72a. The coil spring 73 acts to hold the shaft 69 in such position that the cutter blade 70 is in raised position when the solenoid 59 is not energized.

The rotation of the shaft 65 which results from the energization of the solenoid 59 also causes the rotation of a second vertical plate 75, which is connected to the end of shaft 65 remote from the first named vertical plate 66. A pair of lever arms 77 and 78 are connected and operate in the same manner as the above described lever arms 67 and 68. The lever arms 77 and 78 are provided with a retainer arm 79, pins 80 and 81, and a coil spring 82. The lever arms 77 and 78 are connected to a hollow shaft 83 which is concentric with and surrounds the above mentioned shaft 69. A film tacker 84 is pivotally mounted adjacent the free end of the hollow shaft 83 and adapted to be pivoted vertically upon rotation of the hollow shaft 83. The coil spring 82 acts to hold the hollow shaft 83 in such position that the film tacker 84 is in raised position when the solenoid 59 is not energized.

The cutter blade 70 acts upon its downward pivotal movement to sever one film transparency 191 from the film roll 190 which is mounted on the reel 49 and sprockets 50. The film tacker 84 acts upon its downward pivotal movement to engage the transparency 191 just before the film cutting operation is completed. The film tacker 84 contains a heating element 85 which is connected to the electrical circuit and which transmits heat to a small rectangular portion 86, which engages the film and exerts downward pressure upon it. The heat from the heating element 85 is transmitted through the rectangular portion 86 to act upon heat sensitive adhesive which covers the upper surface of the mount 12a. It thus causes the film transparency 191 to be tacked and held by the adhesive in its proper position upon the upper surface of the film mount 12a.

The above described vertical plate 66, which is part of the structure controlling the operation of the film cutter blade 70, is provided on its periphery with a notch 90. A micro-switch 91 is mounted on the chassis 10. The operating arm 92 of the micro-switch 91 carries a roller 93, which rides on the periphery of the vertical plate 66. When the solenoid 59 is not energized, the roller 93 is disposed within the notch 90 and the operating arm 92 is held in such position that the first pair of contacts of micro-switch 91 are closed and the second pair of contacts are open. When the vertical plate 66 starts to rotate, the roller 93 is moved out of the notch 90 and the operating arm 92 is moved to open the first pair of contacts and close the second pair, which remain in such condition until the vertical plate 66 has completed its single revolution, at which time they are again returned to normal by the roller 93 moving into the notch 90.

The folding and sealing of the mount is started by the energization of a solenoid 100, which moves a stop member 101 to release the stop pin 102a of a single revolution clutch 102 and permit the rotation of a plate 103, which is mounted adjacent the end of the above described shaft 58. A first lever arm 104 is attached at one end adjacent the periphery of the plate 103 and at its opposite end to one end of a second lever arm 105. The second lever arm 105 is secured adjacent its mid-portion to a fulcrum pin 106 which is secured to an upright 107, which extends vertically upwardly from the chassis 10. The opposite end of the second lever arm 105 is provided with an elongated longitudinal slot 108, in which a roller 109 is mounted for reciprocal movement.

A guillotine shaped scaffold 110 extends upwardly from the chassis 10 adjacent the upper end of the second lever arm 105. The opposite sides of the scaffold 110 are provided with elongated vertical slots 112 and 113. A film folder 114 is mounted for reciprocal vertical movement with respect to the scaffold 110. The folder 114 is provided at its upper end with a pair of outwardly directed pins 115, which extend into and are reciprocally movable within the slots 112 and 113. One of the pins 115 extends into the roller 109, so that upward movement of the opposite end of the second lever arm 105 will cause the film folder 114 to move downwardly within the scaffold 110. The opposite sides of the scaffold 110 are provided with a pair of vertical racks 116, having teeth which are engaged by a pair of circular pinion gears 117 carried by the folder 114. This rack and pinion arrangement assures controlled vertical movement of the folder 114.

The folder 114 is provided with a pair of long narrow spaced blades 118 which extend downwardly almost to the bottom of the scaffold 110. The folder 114 is also provided with a pair of shorter and wider downwardly directed film mount guides 119. The film mount guides 119 are tapered at their lower ends.

The track 11 continues past the lower end of the film guide 180 to the far side of the scaffold 110. Mounted beneath the scaffold 110 are a stationary sealing block 120 and an adjacent movable sealing block 121, the latter being mounted for reciprocal movement toward the stationary sealing block 120. Extending between the sealing blocks 120 and 121 when they are in open position is a vertical slot 122, which extends longitudinally with respect to the track 11 adjacent the end thereof. The lower ends of the blades 118 are disposed directly above and in line with the sealing slot 122.

Upon the energization of the solenoid 100, the film folder 114 moves downwardly within the scaffold 110. The web 12, which has been briefly described above, is preferably formed of cardboard and is provided with a longitudinal score 123, which extends along its entire length. The side of the web 12 which is exposed and faces upwardly from the track 11 is preferably provided with heat sensitive adhesive material which covers its entire surface.

When the film folder 114 moves downwardly, the blades 118 engage the midportion of the individual film mount 12a which is disposed therebeneath. An individual film transparency 191 has been properly placed and tacked in position in the mount 12a. The pressure of the blades 118 upon the mount 12a causes it to be folded longitudinally along the score 123. The continued downward movement of the blades 118 carries the folded mount 12a down into the sealing slot 122 to a position between the sealing blocks 120 and 121.

As the mount 12a is folded and moved downwardly within the sealing slot 122, its upper end portions engage the lower portions of the mount guides 119. The mount guides 119 prevent the opposite sides of the mount 12a from being brought completely together. When the film folder 114 has reached the bottom of the scaffold 110, it begins a return upward movement. This movement is caused by the attachment of the first lever arm 104 adjacent the periphery of the plate 103, whereby a single revolution of the plate 103 causes first a downward and then an upward movement of the film folder 114.

A film mount catch 124 is provided adjacent the top edge of the sealing slot 122 on one side thereof to prevent withdrawal of the folded mount 12a from the sealing slot 122 when the film folder 114 is withdrawn. This film mount catch 124 slightly overhangs the top of the sealing slot 122. Since the mount 12a has just been folded, its halves naturally tend to spring apart from each other and return to their former position. The half of the mount 12a disposed beneath the film mount catch 124 will thus be moved against the wall of the sealing slot 122 and will engage the bottom of the film mount catch 124 to prevent the mount 12a from leaving the sealing slot 122. As mentioned above, the tapered lower ends of the film mount guides 119 hold the upper portions of the folded film mount 12a apart from each other, so that the blades 118 can be removed from the sealing slot 122.

The plate 103 is provided at its periphery with a notch 220, in which is mounted a roller 221, which is attached to the end of the operating arm 222 of a micro-switch 223. When the plate 103 starts to rotate, the roller 221 is displaced from the notch 220 and rides on the periphery of the plate 103 until its revolution is completed.

After the film folder has completed its upward movement, the sealing operation begins with the energization of a sealing solenoid 125, which is operated by direct current. The sealing solenoid 125 is cylindrical and is mounted adjacent the end of the chassis 10 remote from the electric motor 27 and directly adjacent to the movable sealing block 121. Energization of the sealing solenoid 125 results in the outward movement of an armature 126 which is concentrically disposed within the sealing solenoid 125.

A shaft 127 is attached at one end to the armature 126 and at its opposite end to the movable sealing block 121. A helical coil spring 127a surrounds the shaft 127 and acts to hold the armature 126 in retracted position within the sealing solenoid 125 when the solenoid is not energized. The spring 127a extends between the end of the armature 126 and an upright 127b, which is rigidly mounted with respect to the chassis 10.

As the sealing solenoid 125 is energized, the armature 126 and shaft 127 move reciprocally outwardly from the sealing solenoid 125, causing the movable sealing block 121 to press the film mount 12a between it and the stationary sealing block 120. The sealing blocks 120 and 121 are shaped so that they engage only the mount itself and not the film transparency. They are accordingly provided with central openings which correspond in shape and positioning to the openings 13 in the film mount 12a.

The sealing blocks 120 and 121 are each provided with heating elements 120a and 121a respectively which are connected to the electrical circuit and which supply heat to the sealing blocks 120 and 121. As the movable sealing block 121 presses the mount 12a against the stationary sealing block 12, the adhesive bearing surfaces of the film mount 12a are brought into engagement with each other and the heat causes the opposite sides of the mount to be firmly sealed together.

Upon the de-energization of the sealing solenoid 125, its armature 126 is moved back toward the sealing solenoid 125 by the spring 127a, carrying the movable sealing block 121 away from the stationary sealing block 120. The sealed mount 12a is then free to drop downwardly by the force of gravity into a film mount stacking tray 130, one end of which is disposed directly beneath the sealing slot 122. The stacking tray 130 extends transversely with respect to the chassis 10 and is provided with a movable block 131, which frictionally engages its sides. A leaf spring mount retainer 132 is attached at one end to the bottom of the stationary sealing block 120. Its opposite front end is provided with a hook 133, which extends downwardly into the open top of the stacking tray 130.

When the mount 12a drops from the sealing slot 122 into the stacking tray 130, it drops between the hook 133 and the end of the stacking tray 130. It remains there until the next mount has dropped into the sealing slot 122 and is ready to be sealed. When the sealing solenoid 125 is energized for the next sealing operation, it also acts to move the mount 12a which was dropped in the stacking tray 130 after the previous sealing operation past the hook 133 to make room for the next sealed mount 12a to drop into the stacking tray 130.

This is accomplished by means of a pusher plate 135, which is disposed at the end of the stacking tray 130 beneath and slightly behind the sealing slot 122. The pusher plate 135 is attached to a shaft 136, which is in turn attached adajcent the lower end of a pivot arm 137. The pivot arm 137 is pivotally secured at its upper end to the top of an upright 127b. A collar 127c is secured to the shaft 127 and acts to engage and swing the pivot arm 137 when the armature 126 moves. Because of the mechanical advantage provided by the leverage of the pivot arm 137, the movement of the armature 126 is increased sufficiently to move the previously sealed mount 12a past the hook 133 when the sealing solenoid 125 is energized.

Mounted directly behind the sealing solenoid 125 is a micro-switch 168. Its operating arm 169 extends upwardly and carries a pin 170 which engages the end of the armature 126 of the sealing solenoid 125. When the sealing solenoid 125 is energized, its armature 126 moves away from the pin 170 to operate the micro-switch 168.

The film mounts are automatically marked sequentially to provide identification. A name or other additional identification may also be applied simultaneously with the number. The numbering operation is performed before the mounts are folded and sealed. The numbering operation is started by the energization of a numbering solenoid 150, causing its armature shaft 151 to move outwardly. Attached to the opposite end of the shaft 151 is a plate 152. One end of a lower arm 153 is secured to the chassis 10 and the other end is secured to the plate 152. One end of an upper arm 154 is secured to the plate 152 and the other end is secured to the axial shaft 157 of a circular 60-tooth numbering wheel 155, which is mounted so that its upper peripheral edge is disposed directly beneath an opening 156 in the track 11. The axial shaft 157 is supported by a bracket arm 158 which is pivotally secured at its opposite end to a vertical support member 159, which is in turn mounted on the chassis 10.

When the numbering solenoid 150 is energized and its armature shaft 151 moves outwardly, the plate 152 is moved outwardly, moving the arms 153 and 154 to substantially a vertical position. This moves the axial shaft 157 of the numbering wheel 155 upwardly, causing the top of the numbering wheel 155 to move upwardly through the opening 156. This causes one of the numbers carried on the peripheral edge of the numbering wheel 155 to be pressed against and printed upon the bottom of the film mount 12a which is disposed above the opening 156 on the track 11. Upon the de-energization of the numbering solenoid 150 the reverse movements take place.

A ratchet assembly is provided which includes a circular toothed wheel 160, which is mounted on the side of the numbering wheel 155 and a ratchet arm 161, which is pivotally mounted adjacent the wheel 160. As the numbering wheel 155 moves upwardly to mark the mount, the ratchet arm 161 moves into the next adjacent tooth of the wheel 160 and causes the numbering wheel 155 to rotate an amount equal to the space from one number to the next adjacent number. The numbering wheel 155 is thus rotated the distance of one number during each numbering operation.

Ink for the numbering is supplied from an ink well 162, which is mounted adjacent the numbering wheel 155. The ink well contains a supply of ink 163, a bottom roller 164, and a top roller 165. The bottom roller 164 picks up the ink 163 and transfers it to the top roller 165. The top roller 165 in turn transfers the ink to the numbering wheel 155 by contacting it through an opening in the side of the ink well 162.

Mounted at the end of the track 11 is a wire 166, one end of which is disposed so that it will be engaged by the edge of the last film mount 12a as it reaches the end of the track 11. The other end of the wire 166 is attached to the arm of a micro-switch 167. The function of the micro-switch 167 will be set forth in describing the operation of the electrical circuit.

Figure 22:
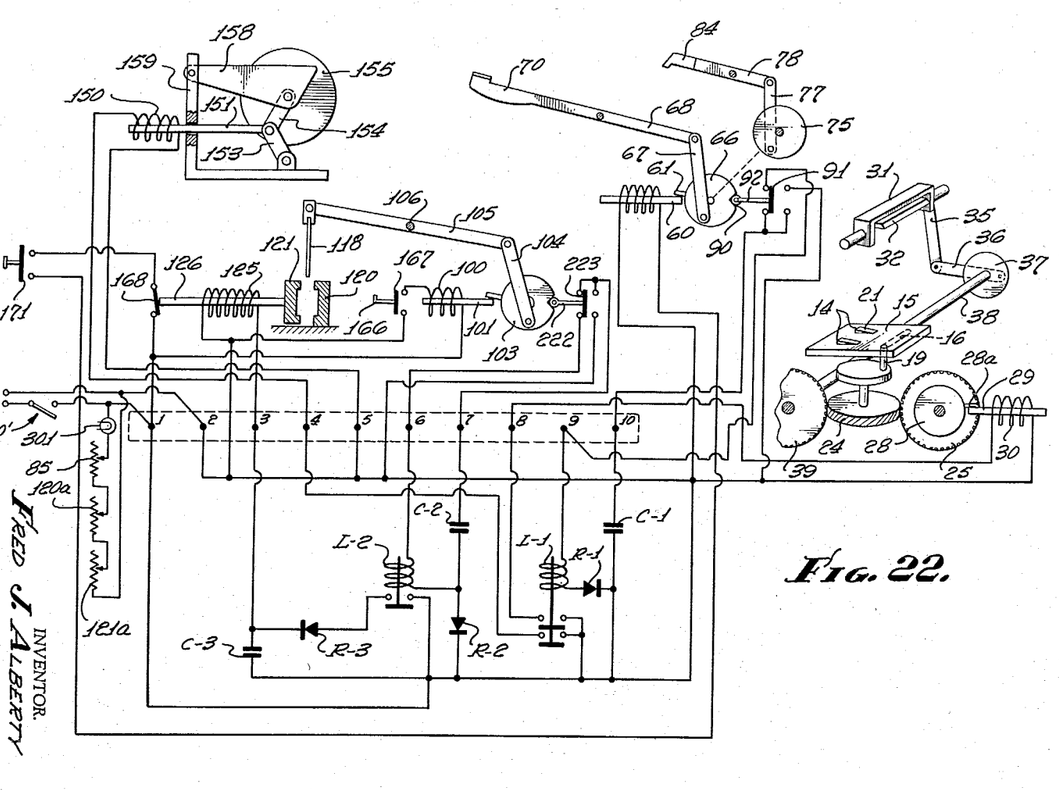
Fig. 22 is a schematic drawing of the electrical circuit, with some of the mechanical operating parts shown in relation to the circuit.

The electrical components of my device are mostly mounted in a control box 300, which is mounted on the chassis 10. The control box 300 also contains the terminal strip which is shown in Fig. 22 of the drawings.

My device is turned on by means of a switch 300', which connects the heating elements 85, 120a and 121a to the source of electrical supply. Operation of the heaters is indicated by an incandescent light bulb 301.

The operation of my device is controlled by a starter switch 171, which is preferably a manually operable push-type switch mounted on the end of a cord. When the starter switch 171 is closed, it closes an electrical circuit from the source of electrical supply through the solenoid 59, causing the cutter blade 70 to cut a single transparency 191 from the film roll 190. The same solenoid 59 causes the film tacker 84 to tack the transparency 191 in place on an individual film mount 12a which is disposed therebeneath.

While the cutting and tacking operations are taking place, the micro-switch roller 93 is displaced by rotation of the vertical plate 66, causing the normally closed first pair of contacts of micro-switch 91 to be opened and the normally second pair of contacts to be closed. The closing of the second pair of contacts completes a circuit from the source of electrical supply through a condenser C–1 and rectifier R–1 to charge the condenser C–1.

When the cutting and tacking operations are completed, the roller 93 moves back into the notch 90 and the first pair of contacts of micro-switch 91 is closed and the second pair opened. The closing of the first pair of contacts completes a circuit from the condenser C–1 through the rectifier R–1 and a relay L–1, energizing the relay L–1 to close its normally open top and bottom contacts. The closing of the top contacts of relay L–1 completes a circuit from the source of electrical supply through the coil of solenoid 30, causing it to become energized and resulting in rotation of the vertical gear 25.

This causes the web 12 to be advanced along the track 11 by the fingers 14 in the manner described above. It also causes operation of the mount cutter 31 to cut an individual mount 12a from the web 12 as soon as the web has completed its forward movement. It further causes rotation of the film sprockets 50 to advance the film roll 190 and place another transparency 191 superjacent the mount 12a which is disposed adjacent the end of the film guide 180.

The closing of the bottom set of contacts of the relay L–1 completes a circuit from the source of electrical supply through the numbering solenoid 150, causing operation of the numbering wheel 155 to mark the mount in the manner described above. The upward movement of the numbering wheel 155 begins at the same time that the web 12 starts its forward movement. However, the numbering wheel 155 does not contact the mount 12a until the forward movement of the web 12 and mounts 12a has stopped.

When the web 12 completes its forward movement, it causes the mount 12a at the end of the track 11 to be moved into engagement with the wire 166 to close the normally open contacts of the micro-switch 167. The closing of these contacts completes a circuit from the source of electrical supply through the solenoid 100, causing the plate 103 to rotate to fold the mount.

As the plate 103 rotates, it moves the operating arm 222 of micro-switch 223 to open its normally closed first pair of contacts and close its normally open second pair of contacts. The closing of the second pair of contacts of micro-switch 223 completes a circuit from the source of electrical supply through a condenser C–2 and rectifier R–2, causing the condenser C–2 to become charged.

When the folding operation is completed, micro-switch 223 returns to its normal state. The closing of its first set of contacts completes a circuit from the condenser C–2 through a relay L–2, causing it to become energized and close its normally open contacts. The closing of these contacts completes a circuit from the source of electrical supply through a condenser C–3 and rectifier R–3 to convert the alternating current to direct current for energization of the direct current sealing solenoid 125.

Movement of the armature 126 of the sealing solenoid 125 acts to seal the mount by moving the movable sealing member 121 toward the stationary sealing member 120. Movement of the armature 126 also acts to operate the micro-switch 168 and open its normally closed contacts. The opening of these contacts breaks the circuit from the starter switch 171, making it impossible for another cycle of operation to be started until after the sealing operation is completed and the armature 126 moves back to close the contacts of micro-switch 168.

When the contacts of micro-switch 168 are closed, the device is then ready for another cycle of operation, which is begun by the closing of starter switch 171.

In normal usage, the operator will visually check the positioning of the individual transparency 191 against the guide lines 183 on the film guide 180 to be certain that the exposure is in its proper position. He will then press the starter switch 171. If the exposure is not in its proper position, it can be quickly adjusted by means of the adjustment knob 56.

If the exposures being mounted are machine made duplicates, the operator merely holds the starter switch 171 closed and the device will perform any desired number of mounting operations automatically.

I claim:

1. An automatic film mounting device for mounting film transparencies which are arranged in connected relation on a roll of film in film mounts which are arranged in connected relation in a continuous web, said device comprising means for feeding said web of film mounts, means for severing individual film mounts from said web, means for feeding said roll of film, means for severing individual film transparencies from said roll, said feeding means causing said severed film mount and severed film transparency to be moved into proper mounting position with respect to each other, means for tacking said transparency to said mount in said position, means for folding said mount to enclose said transparency, and means for sealing said mount around said transparency.

2. An automatic film mounted device as described in claim 1, said means for feeding the web and means for feeding the film roll being mechanically synchronized so that the movement of said web the distance of one film mount results in the substantially simultaneous movement of said film roll the distance of one film transparency.

3. An automatic film mounting device for mounting film transparencies which are arranged in connected relation on a roll of film in film mounts which are arranged in connected relation in a continuous web, said device comprising means for feeding said web of film mounts, means for severing individual film mounts from said web, means for feeding said roll of film, means for severing individual film transparencies from said roll, said feeding means causing said severed film mount and severed film transparency to be moved into proper mounting position with respect to each other, means for tacking said transparency to said mount in said position, means for folding said mount to enclose said transparency, means for sealing said mount around said transparency, each of said film mounts having at least one open window cut therein, said means for feeding the web of film mounts including finger means adapted to extend into one of the windows of each of said mounts and engage one of the edges thereof, means for moving said finger means to cause the movement of said web, said finger means engaging the edge of the window of one mount upon forward movement thereof, said finger means upon reverse reciprocal movement thereof being moved from said window to the window of the next adjacent mount of said web, track means for guiding the movement of said web, said finger means being disposed adjacent said track, a reciprocal member connected to said finger means for reciprocally moving said finger means, said reciprocal member being mounted for reciprocal movement in a direction parallel to said track, a rotatable circular member operably engaged with said reciprocal member, means for rotating said circular member to cause reciprocal movement of said reciprocal member to move said finger means and said web, said reciprocal member including a sliding member mounted for sliding reciprocal movement adjacent to said track, a block mounted for sliding movement transversely across said sliding member, and means disposed adjacent the periphery of said rotatable member engaged with said block whereby the rotation of said rotatable member causes transverse movement of said block and reciprocal movement of said sliding member.

4. An automatic film mounting device for mounting film transparencies which are arranged in connected relation on a roll of film in film mounts which are arranged in connected relation in a continuous web, said web comprising a plurality of adjacent film mounts, each of said film mounts extending transversely across said web and having a pair of open windows extending longitudinally with respect to said web, adhesive means carried by the upper surface of said web, a continuous score extending along the longitudinal axis of said web, means for feeding said web, means for severing said individual film mounts from said web, means for severing individual film transparencies from said roll of film, said feeding means causing said severed film mount and severed transparencies to be moved into mounting position with said transparency disposed on the upper surface of said mount in alignment with one of said windows, means for folding said mount along said longitudinal score to bring said windows into alignment with each other, and means for sealing the adjacent halves of said folded mount to each other with the adhesive means carried by said web.

5. An automatic film mounting device as described in claim 4, said sealing means including means for inserting said folded mount between a pair of sealing blocks, a sealing solenoid connected to one of said sealing blocks, means for energizing said sealing solenoid to move said sealing block into engagement with said folded film mount, means for heating at least one of said sealing blocks, a stationary tray mounted beneath said slot, said sealed mount being adapted to fall by gravity into said stacking tray upon its release by the de-energization of said sealing solenoid, and means operable upon the energization of said sealing solenoid to move the sealed film mounts in said tray to make room for the next sealing mount to fall into said tray.

6. An automatic film mounting device for mounting film transparencies which are arranged in connected relation on a roll of film in film mounts which are arranged in connected relation in a continuous web, said web comprising a series of adjacent film mounts, each of said mounts having a pair of windows, one surface of said web carrying heat sensitive adhesive material thereon, said device comprising a web track, means for feeding said web along said web track with said adhesive carrying surface disposed upwardly, said feeding means being engageable with the windows in said film mounts to advance said web in steps equal to the size of one film mount, a cutter blade extending transversely across said web track, said cutter blade being operable to sever individual film mounts from said web, a sprocketed reel for mounting said roll of film, a film track adjacent said sprocketed reel, means for rotating said reel to feed said film along said track, said film feeding means being inter-related with said web feeding means so that said film is fed the distance of one transparency when said web is fed the distance of one film mount, a film cutter blade extending transversely across the end of said film track, said cutter blade being disposed adjacent said web track and extending parallel thereto, said film track extending perpendicularly to said web track and intersecting said web track, said film cutter blade being operable to sever an individual film transparency from said reel of film, said transparency at the time of severing being disposed above a severed film mount in alignment with one of the windows thereof, tacking means disposed adjacent the end of said film track, said tacking means being engageable with said transparency substantially as it is severed from said roll of film, heating means carried by said tacking means, said tacking means being adapted to transmit heat to secure the transparency to said mount with the adhesive carried by said mount, means for folding said mount along its midportion to enclose said transparency, means for inserting said mount into movable heat sealing means, means for moving said heat sealing means into engagement with said mount to seal the halves of said mount to each other with the adhesive carried by said mount, a stacking tray mounted beneath said sealing means, said sealed mount adapted upon release of said sealing means to fall into said stacking tray, and means for moving said sealed mounts within said stacking tray to maintain said sealed mounts in the order in which they have been sealed.

7. An automatic film mounting device for mounting film transparencies which are arranged in connected relation on a roll of film in film mounts which are arranged in connected relation in a continuous web, said web comprising a series of adjacent film mounts, each of said mounts having a pair of windows, one surface of said web carrying heat sensitive adhesive material thereon, said device comprising a web track, means for feeding said web along said web track with said adhesive carrying surface disposed upwardly, said feeding means being engageable with the windows in said film mounts to advance said web in steps equal to the size of one film mount, a web cutter blade extending transversely across said web track, said web cutter blade being operable to sever individual film mounts from said web, a sprocketed reel for mounting said roll of film, a film track adjacent said sprocketed reel, means for rotating said reel to feed said film along said track, said film feeding means being inter-related with said web feeding means so that said film is fed the distance of one transparency when said web is fed the distance of one film mount, a film cutter blade extending transversely across the end of said film track, said film cutter blade being disposed adjacent said web track and extending parallel thereto, said film track extending perpendicularly to said web track and intersecting said web track, said film cutter blade being adapted to sever an individual film transparency from said reel of film, said transparency at the time of severing being disposed above a severed film mount in alignment with one of the windows thereof, tacking means disposed adjacent the end of said film track, said tacking means being engageable with said transparency, heating means carried by said tacking means, said tacking means being adapted to transmit heat to secure the transparency to said mount with the adhesive carried by said mount, means for folding said mount along its midportions to enclose said transparency, means for inserting said mount into heat sealing means, and means for moving said heat sealing means into engagement with said mount to seal the halves of said mount to each other with the adhesive carried by said mount.

8. An automatic film mounting device as described in claim 1 and a reel having sprockets upon which said roll of film is mounted, said reel being mounted on a shaft and frictionally engaged with said shaft whereby said reel is rotated as said shaft is rotated, and means for rotating said reel against said frictional engagement while said sprocket remains stationary whereby said roll of film may be adjusted for proper alignment of the transparencies thereon with respect to said means for severing individual transparencies.

9. An automatic film mounting device as described in claim 1 and a plurality of solenoids operable to perform said movements, a plurality of electrical switches operable to energize said solenoids and an electrical control circuit including said switches and solenoids whereby the operation of said solenoids is controlled automatically in the sequence set forth to perform the automatic film mounting.

References Cited in the file of this patent
UNITED STATES PATENTS

| | | |
|---|---|---|
| 2,302,561 | Libby et al. | Nov. 17, 1942 |
| 2,725,155 | Fitch et al. | Nov. 29, 1955 |
| 2,819,656 | Patterson | Jan. 14, 1958 |